United States Patent
Clark, Jr.

(10) Patent No.: US 8,674,268 B2
(45) Date of Patent: Mar. 18, 2014

(54) HEATED WATER BUCKET

(76) Inventor: Benjamin T. Clark, Jr., South Bend, IN (US)

( * ) Notice: Subject to any disclaimer, the term of this patent is extended or adjusted under 35 U.S.C. 154(b) by 238 days.

(21) Appl. No.: 13/068,416

(22) Filed: May 10, 2011

(65) Prior Publication Data
US 2012/0288262 A1   Nov. 15, 2012

(51) Int. Cl.
*H05B 3/28* (2006.01)
*A01K 7/00* (2006.01)
*F24H 1/06* (2006.01)

(52) U.S. Cl.
USPC ............. 219/438; 392/447; 392/448; 119/73

(58) Field of Classification Search
None
See application file for complete search history.

(56) References Cited

U.S. PATENT DOCUMENTS

| | | | | | |
|---|---|---|---|---|---|
| 1,616,125 | A | * | 2/1927 | Holman | 119/203 |
| 2,460,509 | A | * | 2/1949 | Keller | 119/73 |
| 2,849,588 | A | * | 8/1958 | Marcuse | 392/444 |
| 3,820,508 | A | * | 6/1974 | Robinson | 119/73 |
| 4,908,501 | A | * | 3/1990 | Arnold, III | 219/438 |
| 5,231,953 | A | * | 8/1993 | Garrett | 392/444 |
| 5,848,701 | A | * | 12/1998 | Riccabona | 206/702 |
| 6,469,281 | B1 | * | 10/2002 | Reusche et al. | 219/438 |
| 7,285,760 | B2 | * | 10/2007 | Reusche et al. | 219/438 |

* cited by examiner

*Primary Examiner* — Joseph M Pelham
(74) *Attorney, Agent, or Firm* — R. Tracy Crump

(57) ABSTRACT

The heated water bucket includes a rubber bodied bucket with an integrated heating unit fitted to the bottom of the bucket. The heating unit covers the entire bottom of the bucket acting as a false "bottom" so that the heating unit does not appear as a foreign object within the bucket. The heating unit is held to the bottom of the bucket by a peripheral flange that extends radially around the inside of the bucket sidewall. The rubber construction of the bucket itself makes the invention more durable, but also improves the bucket's thermal insulation properties, making it more efficient than conventional heated plastic buckets.

6 Claims, 5 Drawing Sheets

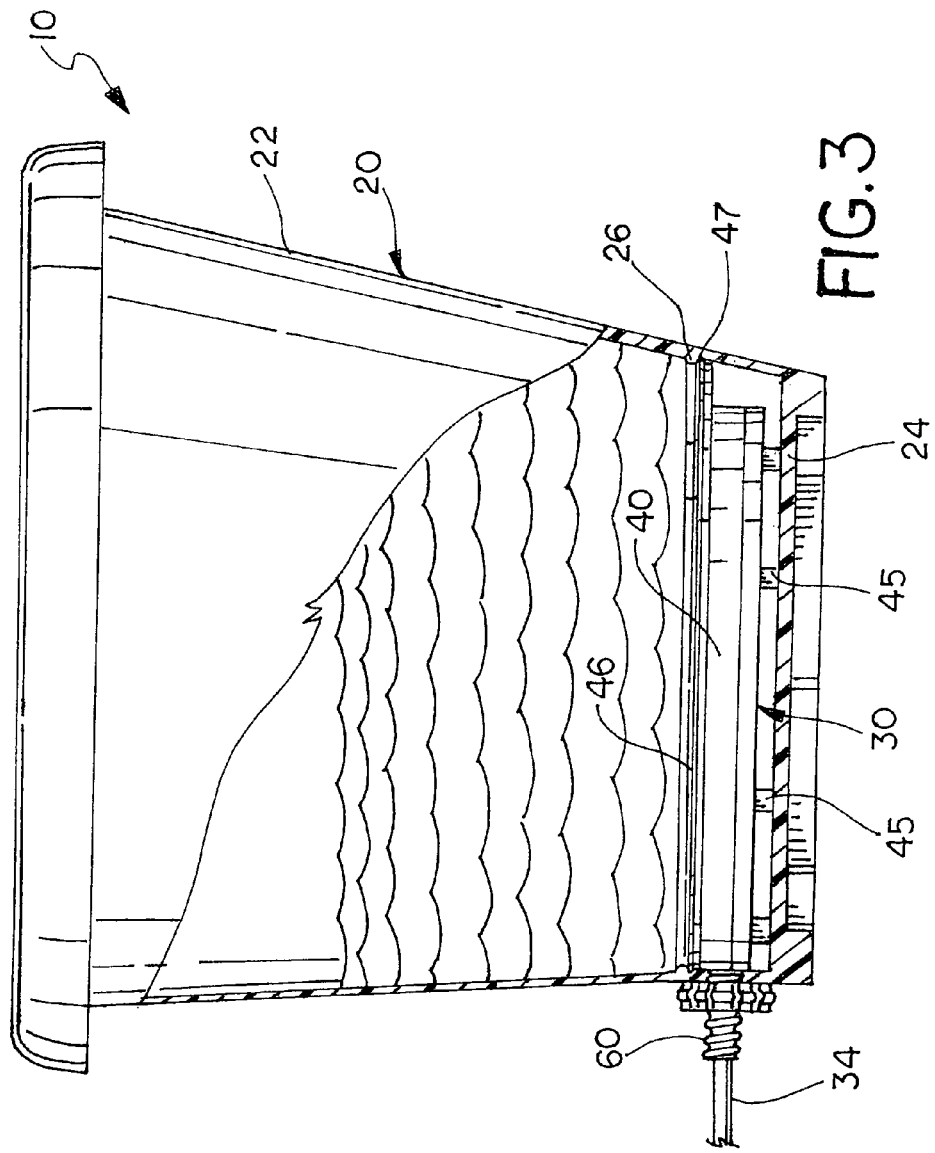

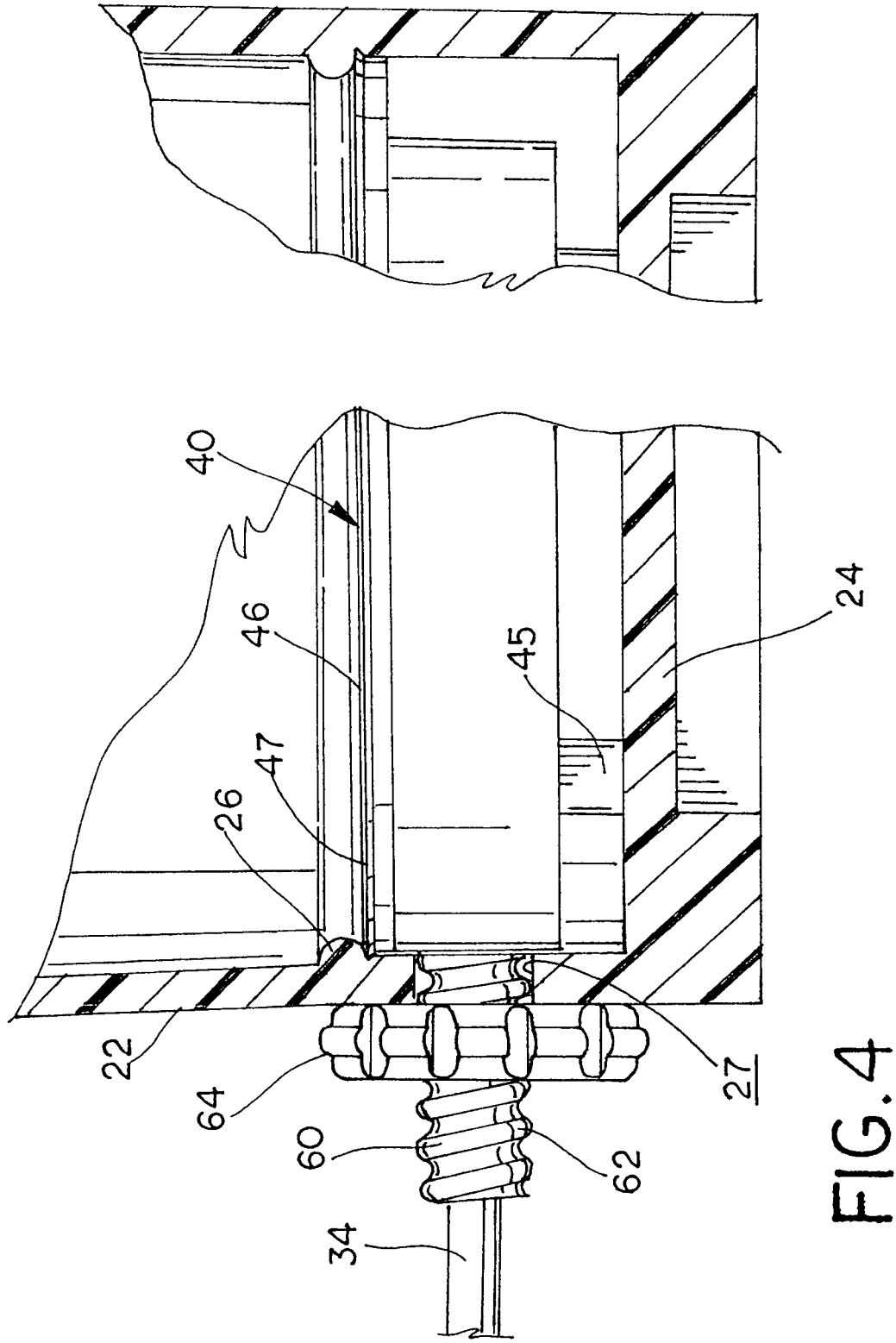

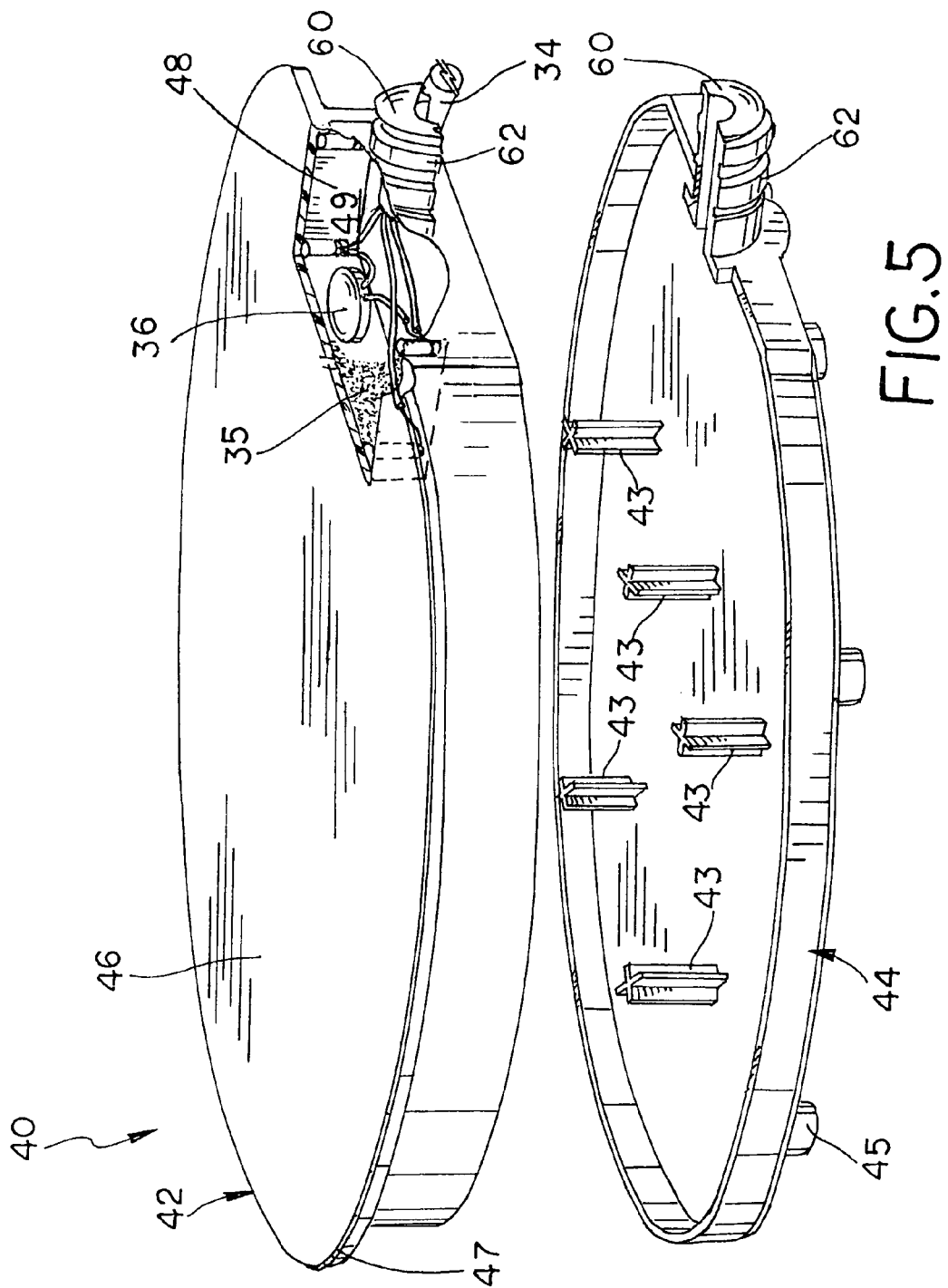

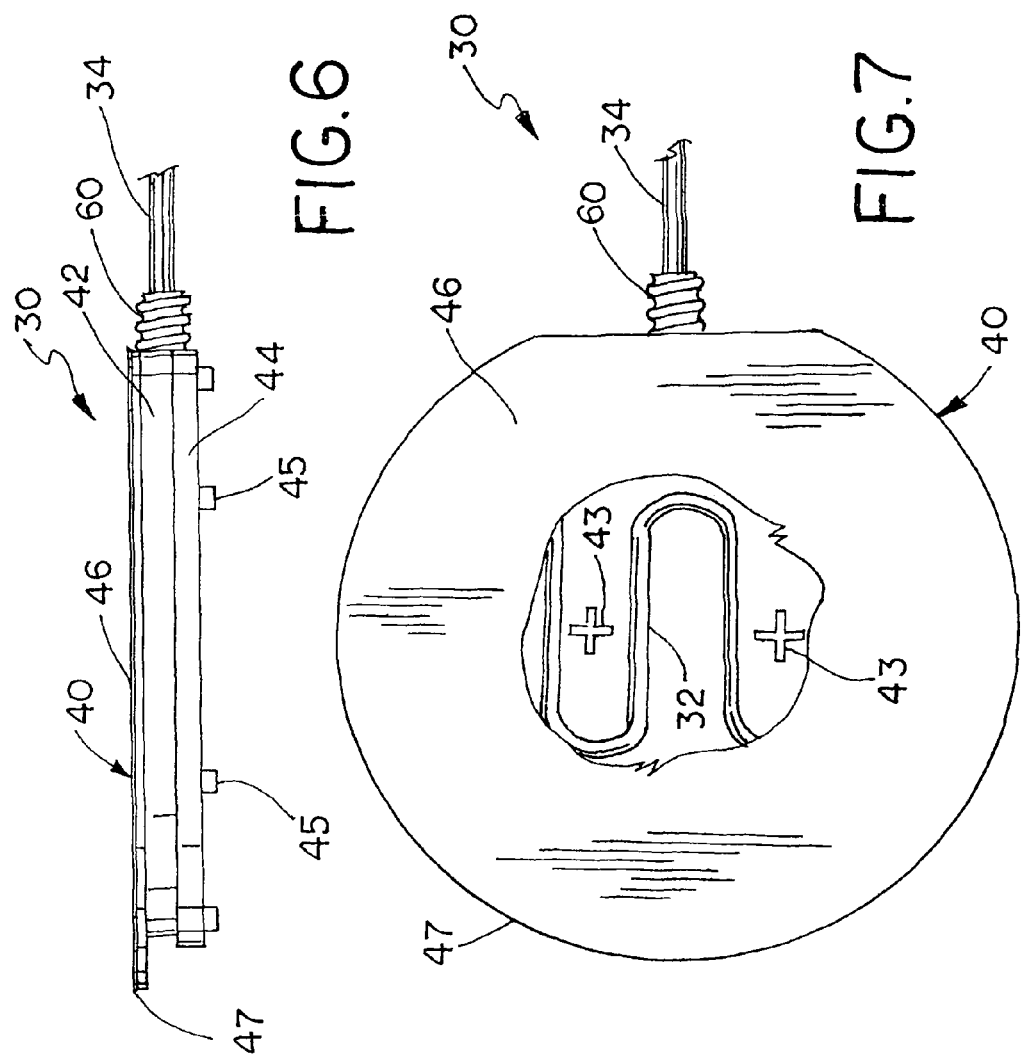

HEATED WATER BUCKET

This invention relates to heated water buckets for live stock and particularly to a heated rubber water bucket.

BACKGROUND OF THE INVENTION

In the live stock industry, heated water buckets are used to keep water from freezing during the winter months and are well known. Heretofore, conventional heated water buckets have used plastic buckets that have an outer heat source either mounted to the bottom of the bucket or wrapped around the sides of the bucket with a second outer bucket or shell covering the heating element. While heated water buckets have used plastic buckets because their plastic construction provides better heat transfer, plastic buckets are more prone to damage and breakage. Plastic buckets are readily broken when kicked or stepped on by a large farm animal. For this reason, rubber water buckets are commonly preferred because they are flexible and will not break when kicked or step on by an animal. While rubber is preferred for durability, rubber buckets have been ill suited for heated application. Simply submerging a heating element in the bottom of a rubber bucket has proven undesirable because, certain livestock such as horses are hesitant to drink from a bucket that contains a foreign object. In addition, simply submerging a heating element within a rubber bucket exposes the heating element's cord to the animal.

The heated water bucket of this invention provides a rubber bucket with an integrated heating unit fitted to the bottom of the bucket. The heating unit covers the entire bottom of the bucket acting as a false "bottom" so that the heating unit does not appear as a foreign object within the bucket. The heating units is held to the bottom of the bucket by a peripheral flange that extends radially around the inside of the bucket sidewall. The rubber construction of the bucket itself makes the invention more durable, but also improves the bucket's thermal insulation properties, making it more efficient than conventional heated plastic buckets.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 3 is a side view of the heated water bucket of FIG. 1 with a portion cut away to show the heating unit;

FIG. 4 a partial view of the heated water bucket of FIG. 1 with a portion cut away to show the heating unit;

FIG. 5 is an exploded view of the heating unit housing of FIG. 3;

FIG. 6 is a side view of the heating unit of FIG. 3; and

FIG. 7 is a top view of the heating unit of FIG. 3 with a portion cut away to show the heating element and reinforcing posts.

DESCRIPTION OF THE PREFERRED EMBODIMENT

Figure 2:
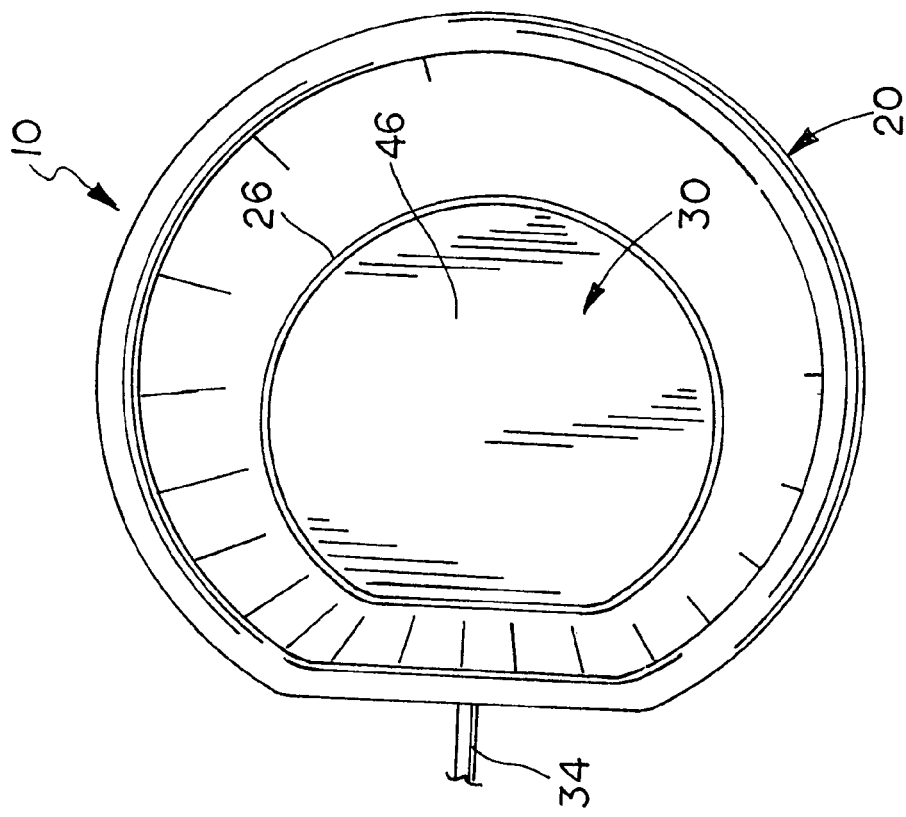
FIG. 2 is a top view of the heated water bucket of FIG. 1.
Figure 1:
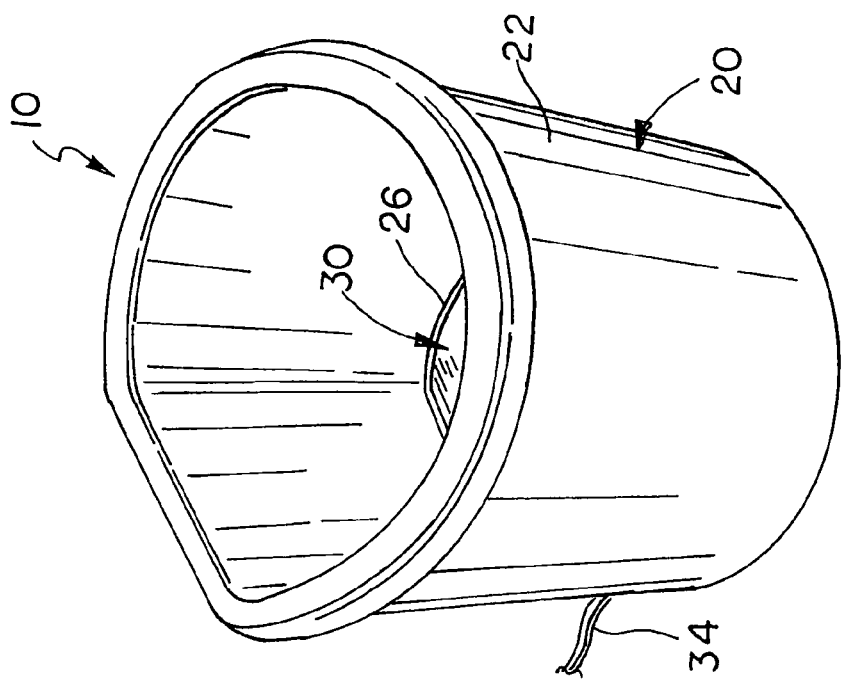
FIG. 1 is a perspective view of an embodiment of the heated water bucket of this invention.

Referring now to the drawings, FIGS. 1-7 show an embodiment of the heated water bucket of this invention, which is designated generally as reference numeral 10. Heated water bucket 10 includes a rubber bucket 20 and a heating unit 30.

Bucket 20 is preferably constructed of butyl rubber although other similar materials may be used, such as other natural and synthetic rubber or plastics. Butyl rubber is preferred for the bucket construction material because of its pliability, durability and thermal insulating properties. Bucket 20 can be configured as a standard round or flat sided bucket. As shown, bucket 20 includes sidewalls 22 and a bottom wall 24, which define an open interior 23. As shown in FIGS. 3 and 4, a peripheral flange 26 extends radially from the sidewall 22 into the bucket interior 23. Flange 26 is spaced above bottom 24. Heating unit 30 is seated within the bottom of bucket 20 and is fitted between peripheral sidewall flange 26 and bucket bottom 24. Flange 26 securely holds heating unit 30 at the bottom of bucket 20; however, adhesives may also be used to further secure heating unit 30 to the bottom of bucket 20. It should be noted that although shown as a peripheral flange that extends around the inside of sidewall 22, any other protruding structure or structures, such as, a shoulder formed in the sidewall or a plurality of tabs, and the like may be used to securely hold heating unit 30 against bottom wall 24 within the teachings of this invention.

Heating unit 30 includes a two piece housing 40, an electrical resistance heating element 32 and thermostat (not shown) disposed within the housing and an electrical cord 34 that extends from the housing. Housing 40 is formed or molded from a strong durable plastic material, such as fiber reinforced nylon. As shown in FIG. 5, housing 40 has an upper half 42 and a lower half 44, which are connected and sealed to prevent any water or moisture from entering the housing. An O-ring (not shown) is seated between halves 42 and 4 to prevent water from entering the interior of the housing and affecting electrical components. Alternatively, housing halves 42 and 44 may be bonded together using adhesives and other water proof sealants to waterproof the housing. Both housing halves 42 and 44 have a plurality of inner reinforcement posts 43 that provide structural integrity to heating unit 30. Lower half 44 has a plurality of feet 45 which space heating unit 30 from bucket bottom wall 24, which prevents thermal transfer through the bottom of the bucket. Upper half 42 has a flat top 46, which acts as the functional "bottom" of bucket 20 and an angled peripheral rim 47 that extends from top 46, which "bites," that is, partially embeds into bucket sidewall 22 directly under flange 26, when heating unit 30 is fitted within bucket 20.

Housing 40 also includes threaded tubular neck 60, that extends through bore 27 in bucket sidewall 22. Each half 42 and 44 forms part of neck 60, which provides the conduit through which the electrical cord 34 of heating unit 30 extends. Neck 60 opens side housing 40 into an partitioned "wiring" area 49 defined by three partition walls 48 formed into upper half 42. The outside of neck 60 has threads 62 formed thereon. The inside of neck 60 has a pair of annular ribs 66, which bite into to the outer jacket of electrical cord 34 to provide another water seal. A lock nut 64 threads onto the neck 60 to prevent leaks around the neck and to further hold heating unit 30 in place. An O-ring (not shown) may also be seated around neck 60 and juxtaposed between the bucket sidewall 22 and lock nut 60 to provide an additional seal between bucket 20 and heating unit 30. Lock nut 64 tights down on neck 60 over the internal ribs 66 to ensure a solid internal seal between neck 60 and electrical cord 34.

Heating element 32 emits thermal energy to heat the water inside bucket 20. Typically, heating element 32 is a foil type electric heater that includes a length of electrical resistance heating wire affixed to a backing of a thin sheet of pliable thermal conductive foil material. Heating unit 30 also includes a thermostat 36, which is mounted to the bottom surface of upper half 42 inside wiring area 49. Typically, the thermostat uses a conventional snap action bimetal design, although other types of thermostats may be used within the teachings of this invention. A conventional electrical cord 34 is used to connect heating unit 30 to an AC electrical power source. Although heating element 32 is preferably powered by a common AC electrical source, the heating element can be modified for DC electrical power within the teachings of this invention. Electrical cord 34 extends through neck 60 and is connected to heating element 32 and thermostat 36. It should be noted that all of the electrical wiring connection between heating element 32, thermostat 36 and cord 34 are contained within wiring area 49, which is in turned sealed and enclosed with an epoxy 35 to prevent water and contaminants from entering the housing interior and affecting the electrical components.

One skilled in the art will note that the heated water bucket of the present invention provides several advantages over convention plastic heated water buckets. The rubber construction of the bucket itself makes the invention more durable, but also improves the bucket's thermal insulation properties, making it more efficient than conventional heated plastic buckets. In addition, the heating unit of this invention is fitted directly in the bottom of the bucket, which puts the heat source directly in contact under the water for maximum thermal transfer, rather than the thermal energy being conducted through the sidewall or bottom wall of the bucket itself. The combination of the heating unit being fitted in the bottom of the bucket along with the superior thermal insulating properties of the rubber buckets over plastic buckets ensures that the heated bucket of this invention is thermally and electrically more efficient than conventional heated plastic buckets.

The heating unit covers the entire bottom of the bucket acting as a false "bottom" so that the unit does not appear as a foreign object within the bucket. The electrical cord for the heating unit is unobtrusively routed through the heating unit's threaded neck that extends through the bucket sidewall, but is secured and sealed by the lock nut and O-ring to prevent any leaks. All electrical connections are sealed in epoxy inside the heating unit to prevent shorts. Water leaking from the bucket, as well as, water leaking into and around the unit units is addressed by multiple seals and water tight engagements between the heating unit itself and between the heating unit and bucket. The heating unit is held securely in place at the bottom of the bucket by the flange that extends radially inward from the bucket sidewall. The reinforcing posts inside the housing, ensure that the housing is strong and durable and will not be damaged if an animal were to step in the bucket and on the heating unit.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A heated water bucket comprising:
    a bucket having a body constructed of rubber and including a side wall and a bottom defining an open interior, the bucket sidewall having a protrusion extending therefrom into the bucket interior and a bore therethrough located between the bucket bottom and the protrusion; and
    a heating unit disposed within the bucket open interior covering the bucket bottom for heating the contents within the bucket interior, the heating unit includes a housing seated between the bucket bottom and the bucket sidewall protrusion, the housing includes a tubular neck protruding therefrom and extending through the bucket sidewall bore and a flat top that abuts against the bucket sidewall and the perimeter of the bucket sidewall and a flat top adapted to form a bottom of a water retaining portion of the open interior, the flat top having a peripheral edge thereof that abuts the bucket sidewall and the protrusion.

2. The heated water bucket of claim 1 wherein the heating unit also includes an electrical heating element disposed within the housing and an electrical cord having a first end electrically connected to the heating element and a second end passing through the neck.

3. The heated water bucket of claim 1 wherein the housing also includes a lock part connected to the neck part for securing and sealing the neck within the bucket sidewall bore.

4. The heated water bucket of claim 1 wherein the protrusion is a peripheral flange protruding radially inward from the bucket sidewall.

5. The heated water bucket of claim 1 wherein the housing flat top has a peripheral rim that embeds into the bucket sidewall.

6. A heated water bucket comprising:
    a bucket having a body constructed of rubber and including a side wall and a bottom defining an open interior, the bucket sidewall having a peripheral flange protruding radially inward from the bucket sidewall into the bucket interior and a bore therethrough located between the bucket bottom and the protrusion; and
    a heating unit disposed within the bucket open interior covering the bucket bottom for heating the contents within the bucket interior, the heating unit includes a housing seated between the bucket bottom and the bucket sidewall protrusion, the housing includes a tubular neck protruding therefrom and extending through the bucket sidewall bore and a flat top adapted to form a bottom of a water retaining portion of the open interior, the flat top having a peripheral edge thereof that abuts the bucket sidewall and the protrusion, the heating unit also includes an electrical heating element disposed within the housing and an electrical cord having a first end electrically connected to the heating element and a second end passing through the neck.

* * * * *